(No Model.)

T. F. CARROLL & S. J. CILLEY.
CHECK REIN HOLDER.

No. 360,278. Patented Mar. 29, 1887.

Witnesses
Geo. Thorpe
C. E. Doyle

Inventors
Thos. F. Carroll
S. J. Cilley
By their Attorneys
C. A. Snow & Co.

UNITED STATES PATENT OFFICE.

THOMAS F. CARROLL, OF LACONIA, AND SEWELL J. CILLEY, OF GONIC, N. H.

CHECK-REIN HOLDER.

SPECIFICATION forming part of Letters Patent No. 360,278, dated March 29, 1887.

Application filed January 15, 1887. Serial No. 224,480. (No model.)

*To all whom it may concern:*

Be it known that we, THOMAS F. CARROLL and SEWELL J. CILLEY, citizens of the United States, residing, respectively, at Laconia and Gonic, in the counties of Belknap and Strafford, and State of New Hampshire, have invented a new and useful Improvement in Check-Rein Holders, of which the following is a specification.

Our invention relates to an improvement in check-rein holders or hooks, and has for its object the provision of means whereby the driver of the vehicle may uncheck the horse to allow him to drink or graze, and then to check him up again without the driver being obliged to leave his seat.

Figure 1:
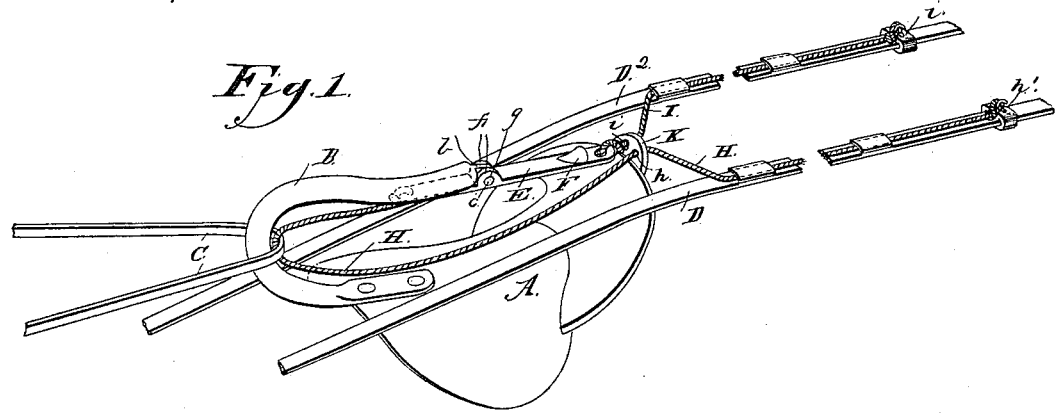
Figure 2:
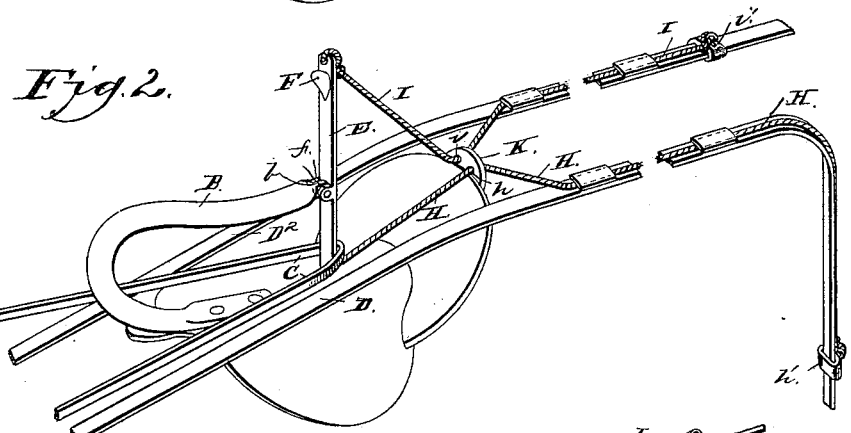
Figure 4:
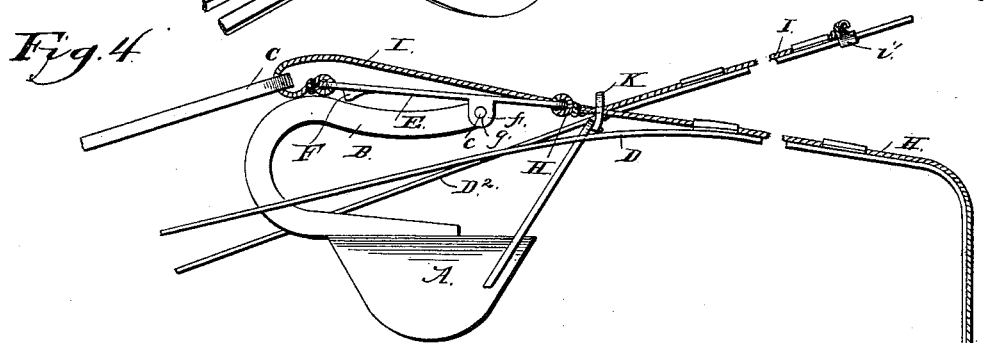
Figure 3:
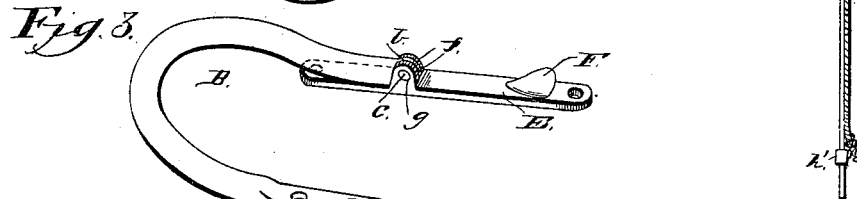

In the accompanying drawings, Figure 1 shows a portion of a saddle with our improved check-rein hook attached thereto with the check-rein in its place in the hook. Fig. 2 is a similar view with the check-rein in the act of being thrown out of the hook. Fig. 3 is a detail perspective view of the hook and lever. Fig. 4 is a side view showing the check-rein as thrown out entirely.

Referring to the accompanying drawings, in which similar letters denote corresponding parts in all the figures, A is the saddle, and B the usual check-rein hook attached thereto; C, a portion of the check-rein, and D D² portions of the reins or driving-lines.

E is a lever having the ears $f$ provided with the aligned openings $g$, and said ears pass on either side of the reduced end $b$ of the hook B. A pin, $c$, passes through an opening, $b'$, in said reduced portion $b$ of the hook B, and also through the aligned openings $g$ in the ears $f$, and thereby pivots the lever E on the extreme rear end of the hook B. The rear and longer arm of the lever E is weighted, as seen at F.

H and I are lines, either straps or cords, but preferably cords, as shown in the drawings, attached to the front and rear ends, respectively, of the lever E, and said lines pass through guide-openings $h$ and $i$ in a bracket, K, on the rear part of the saddle.

When the horse is in check, the check-rein C passes around the line H—that is, the said line H passes over in front of and under the said check-rein, as shown clearly in Fig. 1.

Now, it will be readily seen that if the line H is pulled the check-rein will be pulled back until it comes to the front end of the lever E, when, if the pulling is continued, the lever H will be reversed by turning on the pivot $c$, and the check-rein will be thrown out of the holder, as shown in Figs. 2 and 4. It will be seen, however, that in the reversed position the line I is now around and in front of the check-rein C. In order, therefore, to return the check-rein to the holder, it is only necessary to draw the horse's head up by means of the driving-reins and then pull upon the line I. The check-rein will be drawn back to the present front end of the lever in its reversed position, when the said lever will be returned to its first position, throwing the said check-rein into its "check" position. (Shown in Fig. 1.)

The lines H I, after passing through the guide-openings $h\ i$, pass back along the driving-reins D D', respectively, through loops or sleeves on said driving-reins to within easy reach of the driver, where the loops or sleeves cease, and the projecting ends of the said lines H I are provided with metallic sleeves $h'\ i'$ to embrace and slide on the said driving-reins.

Having thus described our invention, what we claim, and desire to secure by Letters Patent of the United States, is—

1. In a check-rein holder, the check-rein hook B and lever E, secured to the said hook, combined with the lines H I, attached to the front and rear ends, respectively, of the lever E, one of said lines being adapted to pass around the check-rein when in the holder and the other to pass around the said check-rein when free from the holder, substantially as described.

2. In a check-rein holder, the check-rein hook B and lever E, secured thereto, and having the longer weighted arm F, combined with the lines H I, attached to the ends of the lever E, and also connected to the driving-reins D D', substantially as described, for the purpose set forth.

3. In a check-rein holder, the check-rein hook B and lever E, combined with the lines H I, attached to the lever at different points, said lines being attached by slides or loops to the driving-reins, as set forth.

In testimony that we claim the foregoing as our own we have hereto affixed our signatures in presence of two witnesses.

THOMAS F. CARROLL.
SEWELL J. CILLEY.

Witnesses:
EDWIN P. THOMPSON,
FRANK S. RITTER.